(12) United States Patent
Bentz (10) Patent No.: US 6,742,008 B2
(45) Date of Patent: May 25, 2004

(54) ACCURATE AND COST EFFECTIVE LINEAR INTERPOLATORS

(75) Inventor: Ole Bentz, Portland, OR (US)

(73) Assignee: Micron Technology, Inc., Boise, ID (US)

(*) Notice: Subject to any disclaimer, the term of this patent is extended or adjusted under 35 U.S.C. 154(b) by 616 days.

(21) Appl. No.: 09/797,491

(22) Filed: Mar. 1, 2001

(65) Prior Publication Data
US 2002/0152248 A1 Oct. 17, 2002

(51) Int. Cl.[7] .............................................. G06F 17/17
(52) U.S. Cl. ....................................................... 708/290
(58) Field of Search ......................................... 708/290

(56) References Cited

U.S. PATENT DOCUMENTS

| | | | | |
|---|---|---|---|---|
| 5,636,339 A | * | 6/1997 | Huang et al. | 345/442 |
| 5,801,678 A | * | 9/1998 | Huang et al. | 345/667 |
| 5,886,911 A | * | 3/1999 | Yang | 708/290 |
| 5,986,635 A | * | 11/1999 | Naka et al. | 345/716 |
| 2002/0076121 A1 | * | 6/2002 | Shimizu et al. | 382/300 |

* cited by examiner

Primary Examiner—David H. Malzahn
(74) Attorney, Agent, or Firm—Fish & Neave; Garry J. Tuma; Evelyn C. Mak (57) ABSTRACT

Linear interpolators that are both accurate and cost effective to implement in hardware are presented. These interpolators use a multi-bit value approach that permits adders to be used instead of multipliers. The inherent error known in multi-bit value approaches is corrected by using a more accurate approximation for a distance ratio used in interpolation calculations.

41 Claims, 8 Drawing Sheets

ACCURATE AND COST EFFECTIVE LINEAR INTERPOLATORS

BACKGROUND OF THE INVENTION

This invention relates to linear interpolators. More particularly, this invention relates to linear interpolators that are accurate and cost-effectively implemented in hardware.

Linear interpolation may be the simplest, fastest, and most commonly implemented form of interpolation. It is based on a straight line relationship between two values, points, pixels, colors, etc. Linear interpolation is a well-known mathematical operation that computes a value between two known values given the ratios of a distance from each known value to an intermediate value divided by the distance between the two known values. For example, given two values P1 and P2, and given that the ratio of a distance from an intermediate value to P2 divided by the distance between P1 and P2 is R1, and the ratio of a distance from the intermediate value to P1 divided by the distance between P1 and P2 is R2, the interpolated value $I_{V1}$, can be represented as follows:

$$I_{V1} = R1 * P1 + R2 * P2 \quad (1)$$

The sum of the two ratios, R1 and R2, is equal to one. Therefore, the interpolated value can be represented in terms of one ratio. Assigning R1 to F, commonly known as the linear interpolation factor, $I_{V1}$ can be represented as follows:

$$I_{v2} = F * P1 + (1-F) * P2 \quad (2)$$

This is a preferred equation for representing linear interpolation because the two distance ratios are in terms of one ratio, F.

Implementing this interpolation in, for example, Application Specific Integrated Circuit (AISC) hardware typically requires two multipliers, an adder, and a subtractor. Primarily because of the multipliers, this conventional approach is expensive to implement. Multipliers occupy large amounts of circuit area because of the number and sizes of transistors included in each. Because adders require less transistors and thus occupy less circuit area, adders are less expensive to implement. As a result, adders are preferred over multipliers where cost is an issue.

A second approach to linear interpolation reduces the cost somewhat by approximating one of the distance ratios. Because (1−F) is approximately equal to ~F, which is the logically inverted value of F, or the one's complement of F, the interpolated value $I_{V2}$ can be represented as follows:

$$I_{v2} = F * P1 + \sim F * P2 \quad (3)$$

This approach typically requires two multipliers, an adder, and an inverter. Although the use of an inverter rather than a subtractor as in the conventional approach reduces the hardware implementation cost somewhat, an error is introduced because of the approximation.

A third approach uses the approximation described in the second approach to construct a set of multi-bit values M. Assuming P1, P2, and M have the same number of bits and that F has n bits, the multi-bit values M can be determined as follows:

$$M_0 = F[0] \quad ? \quad P1 \; : \; P2 \quad (4)$$
$$M_1 = F[1] \quad ? \quad P1 \; : \; P2$$
$$M_2 = F[2] \quad ? \quad P1 \; : \; P2$$
$$\vdots$$
$$M_{n-1} = F[n-1] \quad ? \quad P1 \; : \; P2$$

The multi-bit values M in equation (4) can be represented using "C" programming language notation (other suitable notations can also be used). The question mark represents a select function dependent on a specified bit of F. For example, if the specified bit of F is equal to binary "1" M is assigned the value immediately after the question mark (P1). If the specified bit of F is equal to binary "0", M is assigned the value immediately after the colon (P2). Using the multi-bit values, $I_{V2}$ can be represented as follows:

$$I_{V2}=[M_0+(M_1<<1)+(M_2<<2)+ \ldots +(M_{n-1}<<(n-1))]>>n \quad (5)$$

The operator "<<" means a logical shift left (shifting a zero in the least significant bit position). The operator ">>" means a logical shift right (shifting out the least significant bit position). The number of bits to shift left or right is indicated by a number immediately to the right of the operator "<<" or ">>." Shifting aligns the multi-bit values in the correct bit position prior to adding (e.g., if M and F are 4 bits, $M_0$=0000.xxxxb, $M_1$<<=000x.xxx0b, $M_2$<<2= 00xx.xx00b, and $M_3$<<3=0xxx.x000b). Shifting the sum of these multi-bit values by n removes the fractional part of the interpolated result. Prior to shifting right by n, the summation produces a term in the form "xxxx.xxxxb." After the shift, $I_{V2}$ can be represented in the form "xxxxb."

This approach significantly reduces the cost of implementing an interpolator to perform this calculation by eliminating the use of multipliers. The multi-bit values allow the interpolation to be implemented using only (n−1) adders and shifters, which occupy less area in hardware and are thus less expensive to implement than the multipliers used in the conventional approach. However, as with the second approach, approximating (1−F) with ~F introduces an error. Therefore, the interpolated value does not have the same accuracy as that of the conventional approach.

In view of the foregoing, it would be desirable to provide a linear interpolator that is both accurate and cost effective to implement in hardware.

SUMMARY OF THE INVENTION

It is an object of this invention to provide a linear interpolator that is both accurate and cost effective to implement in hardware.

In accordance with this invention, a linear interpolator is provided that combines the accuracy of the conventional approach with the cost effective implementations of other known approaches. The present invention uses multi-bit values to eliminate the use of multipliers. Moreover, the present invention improves interpolation accuracy by representing the distance ratios more accurately as follows: because F is a fraction between zero and one inclusive (i.e., 0≦F≦1), ~F is equivalent to ~F+1(lsb) (i.e., a binary "1" in the least significant bit position), or the two's complement of F. Through algebraic manipulations, linear interpolation can be accurately performed using the multi-bit value approach in equation (5) when the following two terms are preferably added to the multi-bit value summation prior to shifting right by n: (P2<<n) and P2. These two terms correct the inherent error common in known linear interpolators.

The present invention requires (n+1) adders, which are less costly to implement than approaches involving multipliers. The (n+1) adders represent only a modest increase in the number of devices as compared to known approaches, but result in substantially the same accuracy as the conventional approach while requiring less circuit area to implement.

Advantageously, linear interpolators of the present invention can be combined. For example, three linear interpolators can be combined to form a bilinear interpolator that operates on four values and two distance ratios. Similarly, seven linear interpolators of the present invention can be combined to form a trilinear interpolator that operates on eight values and three distance ratios.

Linear interpolators of the present invention can be advantageously used, for example, in texture filter circuits associated with computer graphics.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides linear interpolators that are accurate and cost effective to implement in hardware. The invention combines the accuracy of the conventional approach described above with the cost effectiveness of other existing approaches. The conventional approach often uses multipliers, which are costly to implement because of circuit complexity and required circuit area. Other existing approaches reduce the cost by approximating the distance ratio, which allows them to use adders instead of multipliers. However, while the existing approaches reduce the implementation cost, these approaches lack the accuracy of the conventional approach.

The present invention improves accuracy by correcting the inherent error in existing cost effective approaches. These existing approaches approximate the distance ratio (1−F) with ~F, the logically inverted value of the linear interpolation factor F. For example, given that F is four bits and equal to "0.1000b" (binary) (values are typically represented in binary form in hardware), (1−F) is equivalent to "0.1000b" and ~F is equivalent to ". . . 111.0111b." Although the fractional component of (1−F) and ~F are extremely close numerically, this approximation can introduce an error in the results.

Instead of approximating the distance ratio, the present invention advantageously sets ~F equivalent to ~F+1(lsb), where F is a fraction between zero and one inclusive (i.e., 0<F<1) and 1(lsb) represents a binary "1" in the least significant bit position of F. For example, if F is four bits (i.e., .xxxxb), then 1(lsb) is "0.0001b". If F is three bits (i.e., .xxxb), then 1(lsb) is "0.001b." Thus the distance ratio (1−F) is equivalent to (1.0+~F+1(lsb)). The interpolated value $I_{V3}$ can be represented as follows:

$$
\begin{aligned}
I_{V3} &= F*P1 + (1.0 - F)*P2 \\
&= F*P1 + (1.0 + (\sim F + 1(lsb)))*P2 \\
&= F*P1 + \sim F*P2 + (1.0 + 1(lsb))*P2 \\
&= F*P1 + \sim F*P2 + (P2 \ll n) + P2
\end{aligned} \quad (6)
$$

Using the multi-bit value approach described in equation (4), the interpolated value $I_{V3}$ can be computed using equation (7) below, which is equation (5) with additional terms (P2<<n) and P2.

$$I_{V3}=[M_0+(M_1<<1)+(M_2<<2)+ \ldots +(M_{n-1}<<(n-1))+(P2<<n)+P2]>>n \quad (7)$$

As described in conjunction with equation (5), the use of logical shifters places the multi-bit values and the P2 term in the correct bit position prior to summing the terms (e.g., if F, P2, and M are 4 bits, $M_0$=0000.xxxb, $M_1$<<1= 000x.xxx0b, $M_2$<<2 00xx.xx00b, $M_3$<<3 =0xxx.x000b, P2<<n=xxxx.0000b, and P2 =0000.xxxxb). Shifting the summation right by n removes the fractional part of $I_{V3}$, thus producing an integer result.

This approach requires (n+1) adders, which is a modest increase in adders over the conventional approach. More importantly, however, the extra terms (P2<<n) and P2 correct the approximation error inherent in existing approaches, resulting in accuracy comparable or equal to that of the conventional approach.

Further simplification is possible. When linear interpolation is used, for example, in texture filtering associated with computer graphics, video image scaling, or any other implementation where F is strictly less than one and greater than or equal to zero (i.e., 0<F<1), the term (P2 <<n) can be removed. The interpolation can then be represented as follows:

$$I_{V3}=F*P1+\sim F*P2+P2 \quad (8)$$

Using the multi-bit value approach described in equation (4), the interpolated value can be computed using equation (5) with the additional term P2. This requires a total of n adders. $I_{V3}$ is as follows:

$$I_{V3}=[M_0+(M_1<<1)+(M_2<<2)+ \ldots +(M_{n-1}<<(n-1))+P2]<<n \quad (9)$$

Figure 1:
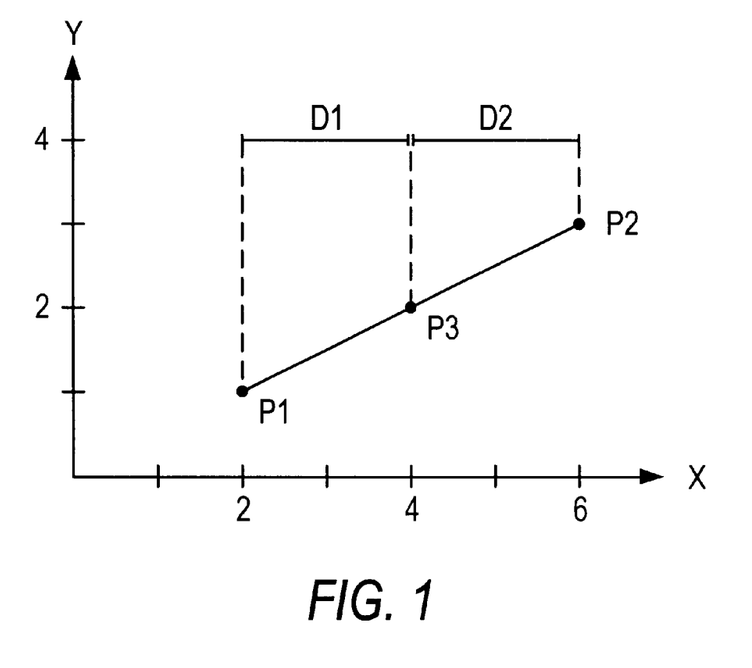
FIG. 1 is a graphical illustration of points and distances used in linear interpolation.

FIG. 1 shows two values P1 and P2, and respective distances D1 and D2 to intermediate value P3. Assuming, for illustration purposes only, that P1 and P2 are eight bits and F is four bits, P1 is equal to "0000 0001b" (or 1 d (decimal)), P2 is equal to "0000 0011b" (or 3 d), and F, represented by "D2/(D1+D2)", is equal to "0.1000b" (or 0.5 d). Since F is strictly less than one, the interpolated value P3 can be computed without the term (P2<<n). From equation (9), P3 equals "0000 0010b" (or 2 d), which is the ideal value. Using the existing approaches that approximate (1−F) as ~F, equation (5) provides an interpolated value of "0000 00001.1101b" (or 1.8125 d). The present invention thus improves accuracy over existing approaches that approximate the interpolated value.

When calculating the interpolated value using the multi-bit value approach shown in equations (5), (7), and (9), $M_1$ is shifted left by one, $M_2$ is shifted left by two, etc. until the last multi-bit value $M_{n-1}$ is shifted left by (n−1), where n is the number of bits in F. The resulting terms are then added. Shifters and adders perform the same function as the multipliers, where shifters place the terms in the correct bit positions before the terms are summed. Shifting the sum right by n removes the fractional part (or n least significant bits) of the interpolated result.

When shifting right by the number of bits in F, the interpolated result can be represented in a number of ways. The interpolated result can be rounded down to an integer by truncating the fractional part. Or the interpolated result can be rounded up to the next integer value when the result has any fractional part. Another alternative is to represent the interpolated result with the fractional part.

Yet another alternative is to round the interpolated result to the nearest integer based on a rounding term. For example, 0.5 d can be added to the interpolated result prior to truncating the fractional part. If the fractional part is 0.5 d or greater, the result will be rounded up; if the fractional part is less than 0.5 d, the result will be rounded down.

During summation of the multi-bit values, a carry may be generated. Because F is a fraction between zero and one, the term ~F (equation (3)) results in an infinite number of binary ones to the left of the decimal point. Adding the other terms in the summation generates a carry bit that is propagated to infinity. The interpolated result therefore contains an infinite number of zeros and also a carry, which can be optionally discarded without altering the interpolated result.

Figure 2:
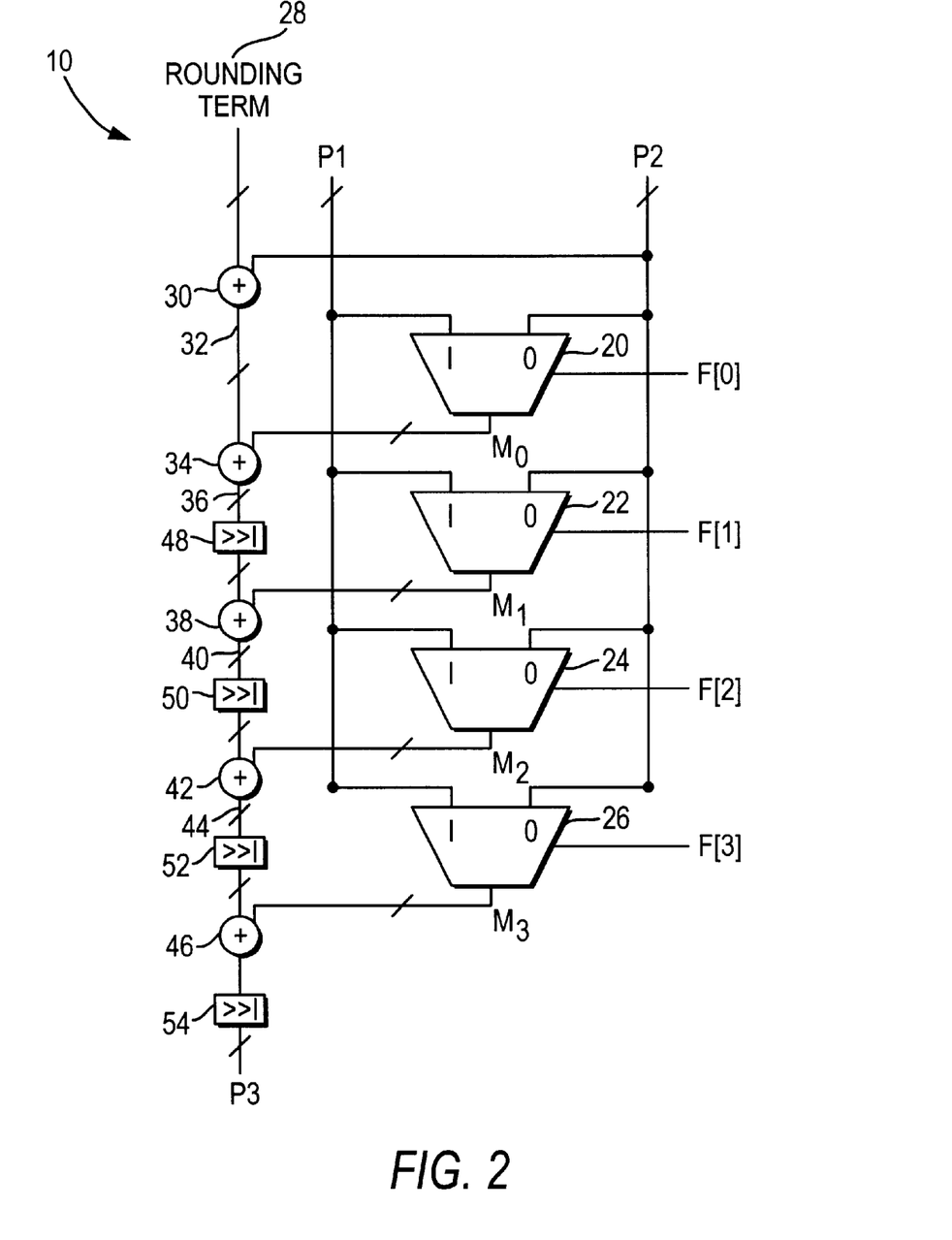
FIG. 2 is a diagram of an exemplary embodiment of a linear interpolator according to the present invention.

An adder tree hardware implementation 10 of a linear interpolator according to the present invention is shown in FIG. 2. In this preferred embodiment, P1 and P2 are eight bits each and F is four bits. However, P1, P2, and F can be any number of bits, and not necessarily the same number. The interpolated value P3 should have enough bits to represent the maximum value of P1 or P2. Multi-bit values $M_0$, $M_1$, $M_2$, and $M_3$ from equation (4) are each implemented using respective multiplexers 20, 22, 24, and 26. The number of multiplexers corresponds to the number of bits in F. The value of each bit in F determines whether P1 or P2 is output (e.g., select input F[0] determines the value of $M_0$, select input F[1] determines the value of $M_1$, etc.).

Rounding can also be used. For example, the rounding term "0000 1000b" (0.5 d) can be an input to adder 30 if P1 and P2 have eight bits and F has four bits.

In accordance with equation (8), P2 is added to rounding term 28 at adder 30 to produce output 32. Output 32 preferably has the same number of bits as P1, P2, and rounding term 28. Output 32 is then added to multi-bit value $M_0$ at adder 34 to produce output 36. Output 36 is fed into logical shifter 48, which shifts output 36 to the right by one bit, discarding the least significant bit. The carry bit is kept out during the logical shift by shifting a binary "0" in the most significant bit position. The output of shifter 48 is then added to multi-bit value $M_1$ at adder 38 to produce output 40. Output 40 is fed into logical shifter 50 with the carry bit kept out. The output of shifter 50 is next added to multi-bit value $M_2$ at adder 42 to produce output 44. Output 44 is fed into logical shifter 52 with the carry bit kept out. The output of shifter 52 is added to multi-bit value $M_3$ at adder 46, where the resulting output is fed into logical shifter 54 with the carry bit kept out to produce linearly interpolated value P3, which is preferably represented as an integer. This process uses a rolling summation to add the multi-bit values while properly shifting the fractional part of the interpolated result.

Variations to the approach described above are possible. The number of bits in each of the linear interpolation inputs to adder tree 10 (i.e., P1, P2, F, and rounding term 28) can be varied. If desired, the interpolated value P3 can be produced with fractional bits, by not discarding the least significant bits at each adder stage, but instead, storing the shifted bits in a separate register. Rounding can be included or omitted. Adder tree 10 can alternatively be implemented with simple ripple-carry adders, carry-save adders, carry-select adders, Wallace-tree adders, or any other suitable adders. Linear interpolation is implemented preferably in hardware, but also can be implemented in software or in a combination of both hardware and software.

Advantageously, three linear interpolators of the present invention can be combined to form a bilinear interpolator. Bilinear interpolation obtains a sample value through the linear interpolation of four values and two distance ratios. A bilinear interpolator has the advantage of creating a smoother image, but at the same time can alter the original data and is computationally more expensive to implement than a linear interpolator.

Figure 3:
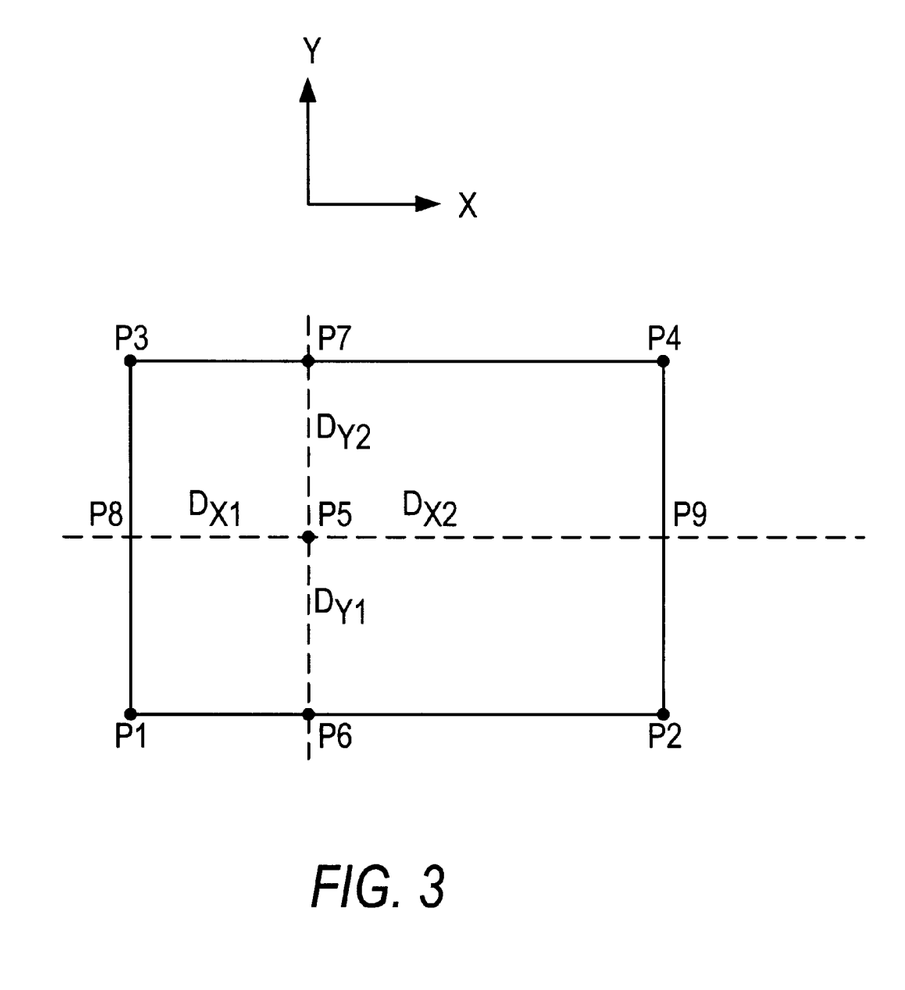
FIG. 3 is a graphical illustration of points and distances used in bilinear interpolation.

FIG. 3 illustrates four points, P1, P2, P3, and P4, and intermediate value P5 which lies within the four-sided polygon formed by the four given points. In many instances, the four points are neighboring points that form a square of unit length or any other length. The four points can also form a rectangle.

Bilinear interpolation can start by horizontally interpolating the top and bottom sets of corner values P1–P2 and P3–P4 to obtain P6 and P7, respectively. The interpolated results P6 and P7 are then vertically interpolated to obtain the interpolated value P5. An alternative process can start by vertically interpolating the left and right sets of corner values P1–P3 and P2–P4 to obtain P8 and P9, respectively, and then horizontally interpolating P8 and P9 to obtain the interpolated value P5. Bilinear interpolation requires two linear interpolation factors:

$$F_X = D_{X2}(D_{X1} + D_{X2})$$

$$F_Y = D_{Y2}(D_{Y1} + D_{Y2}) \tag{10}$$

which are assumed to lie respectively on an x and y coordinate system. Because the four points form a rectangle, the linear interpolation factor $F_X$ is the same for the two horizontal pairs of points, and the linear interpolation factor $F_Y$ is the same for the vertical pairs of points.

Figure 4:
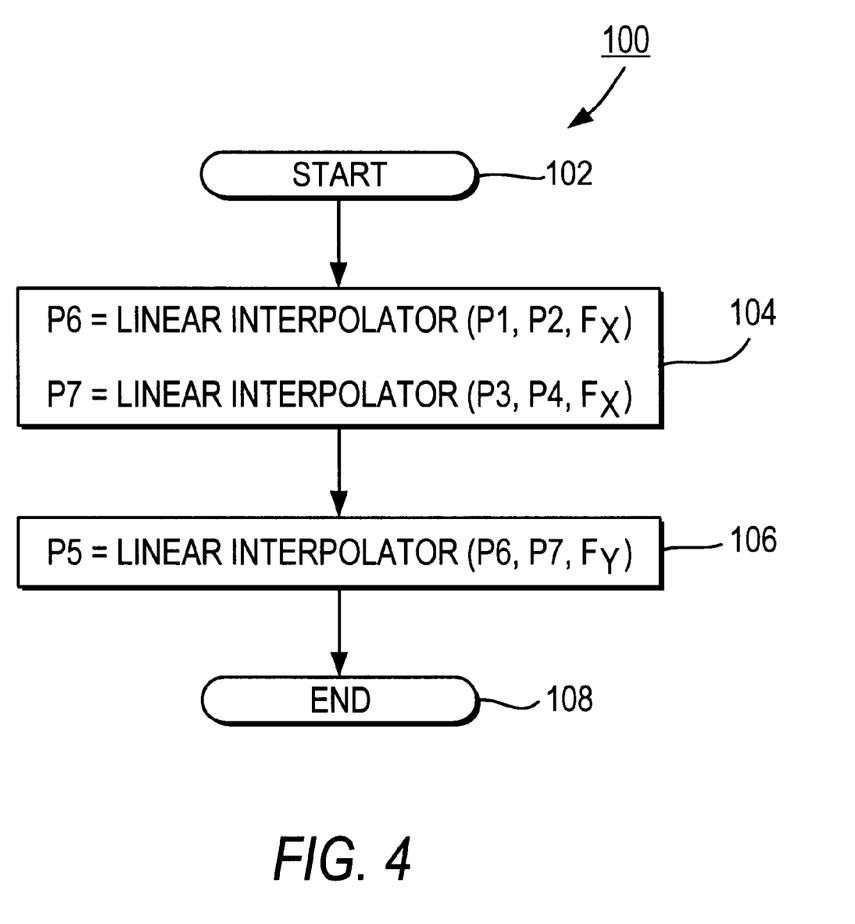
FIG. 4 is a flow chart of an exemplary embodiment of bilinear interpolation according to the present invention.

FIG. 4 is a flow diagram of bilinear interpolation process 100 in accordance with the present invention. Process 100 begins at step 102 with four values, P1, P2, P3, and P4, and linear interpolation factors $F_X$ and $F_Y$. At step 104, process 100 horizontally interpolates the top and bottom set of corner values P1–P2 and P3–P4 with linear interpolation factor $F_X$. Linearly interpolating P1–P2 and P3–P4 produces P6 and P7, respectively. Using equation (2), P6 and P7 are calculated as follows:

$$P6 = F_X * P1 + (1.0 - F_X) * P2 \tag{11}$$

$$P7 = F_X * P3 + (1.0 - F_X) * P4 \tag{12}$$

Assuming that $F_X$ is a fraction strictly less than one, equations (11) and (12) can be simplified as follows:

$$P6 = F_X * P1 + \sim F_X * P2 + P2 \tag{13}$$

$$P7 = F_X * P3 + \sim F_X * P4 + P4 \tag{14}$$

Vertical interpolation is implemented at step 106 using the horizontal interpolation results P6 and P7 and linear interpolation factor $F_Y$ to compute interpolated value P5. The resulting interpolation value P5 is calculated as follows:

$$P5=F_Y*P6+\sim F_Y*P7+P7 \qquad (15)$$

Process 100 ends at step 108.

Bilinear interpolation can be implemented in a two-step process using multi-bit values, which use adders instead of more costly multipliers. Given four points and two distance ratios, two pairs of points are first linearly interpolated with a first distance ratio. Next, the two newly interpolated values are linearly interpolated with the second distance ratio to produce the desired bilinearly interpolated result.

Figure 5:
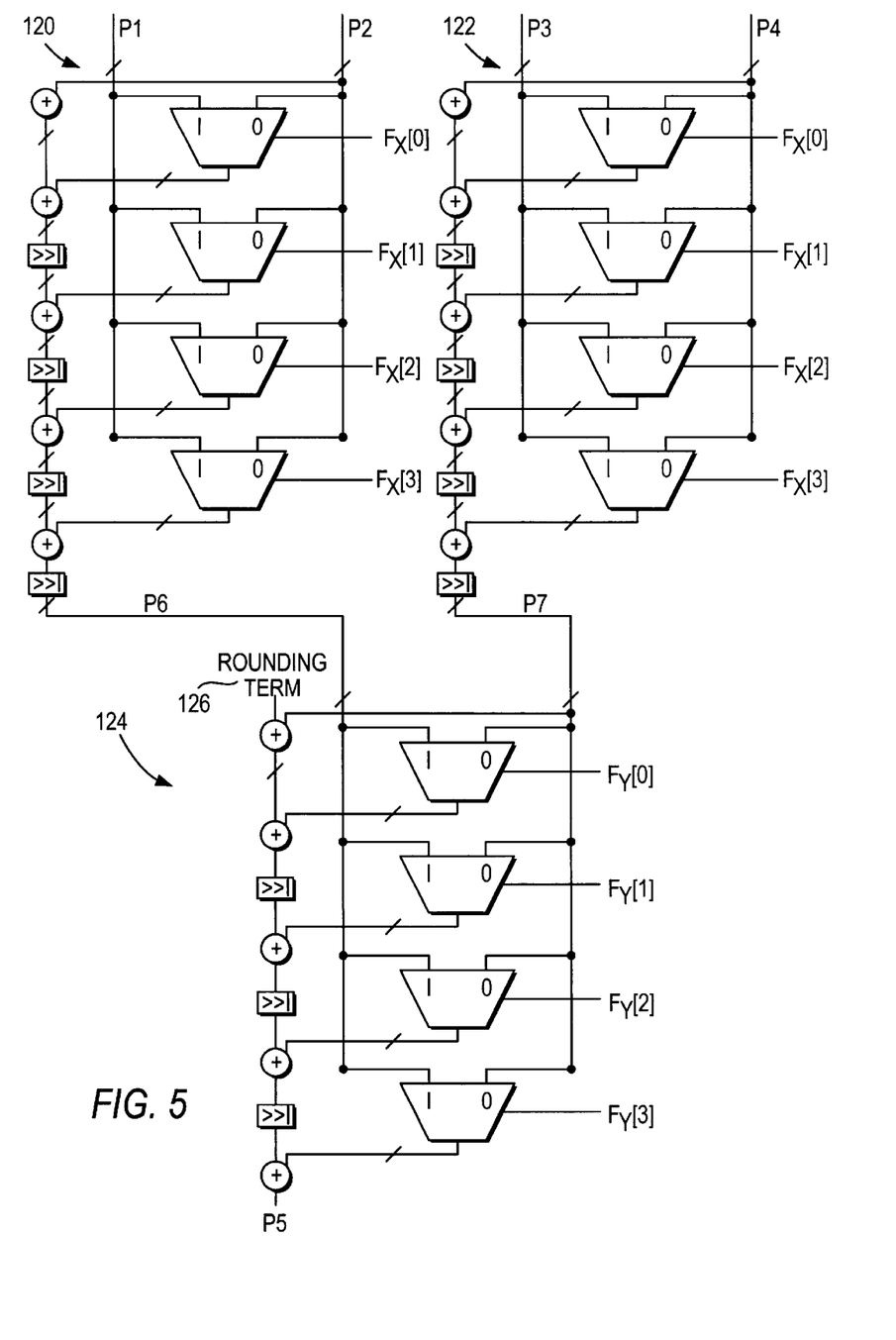
FIG. 5 is a diagram of an exemplary embodiment of a bilinear interpolator according to the present invention.

FIG. 5 illustrates a hardware implementation of bilinear interpolation according to the present invention. Bilinear interpolation is implemented using three adder trees 120, 122, and 124, where each operates similarly to adder tree 10 shown in FIG. 2. When first performing horizontal interpolation as shown in FIG. 5, P1 and P2 are inputs to adder tree 120, while P3 and P4 are inputs to adder tree 122. The resulting linear interpolations from adder trees 120 and 122 produce interpolated results P6 and P7, respectively. Interpolated results P6 and P7 are then fed to adder tree 124 to produce the desired bilinearly interpolated value P5.

There are other ways to implement bilinear interpolation. For example, vertical interpolation can first be performed with P1 and P3 as inputs to one of adder trees 120 and 122, and P2 and P4 as inputs to the other of adder trees 120 and 122. Furthermore, one or two adder trees can be used instead of three. When using one or two adder trees, registers can be used to store intermediate interpolated values that are then fed back to a previously used adder tree at the second stage of interpolation to obtain the final value. If desired, the interpolated value P5 can be produced with fractional bits, by not discarding the least significant bits at each adder stage, but instead, storing the shifted bits in a register. To reduce rounding errors, the fractional bits can be saved at adder trees 120 and 122. The resulting interpolation values along with their fractional parts are then input to adder tree 124, which preferably handles the additional number of bits (i.e., the number of bits in P1 and P2 plus the fractional bits). Rounding 126 can be used or omitted. Rounding can be used either at the end of the bilinear interpolation process or at the second stage. The adder tree shown in FIG. 5 can be implemented instead using simple ripple-carry adders, carry-save adders, carry-select adders, Wallace-tree adders, or any other suitable adders. If more than one adder is used, a combination of such adders can be implemented. Bilinear interpolation is preferably implemented in hardware, but can also be implemented in software or a combination of both hardware and software.

Advantageously, seven linear interpolators of the present invention can be combined to form a trilinear interpolator. Trilinear interpolation obtains a sample value through the linear interpolation of eight values and three distance ratios. Trilinear interpolation creates extremely smooth transitions between small and large texture sizes. Trilinear interpolation can be used in mip-mapping, ray-casting, texture filtering in computer graphics, and other suitable applications.

Figure 6:
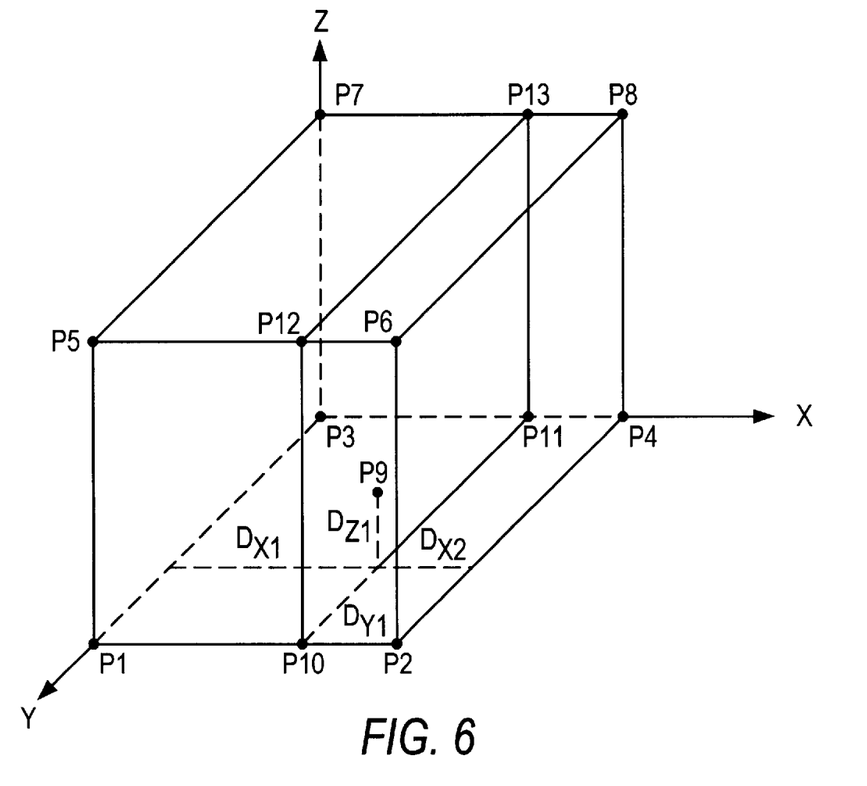
FIG. 6 is a graphical illustration of points and distances used in trilinear interpolation.
Figure 7:
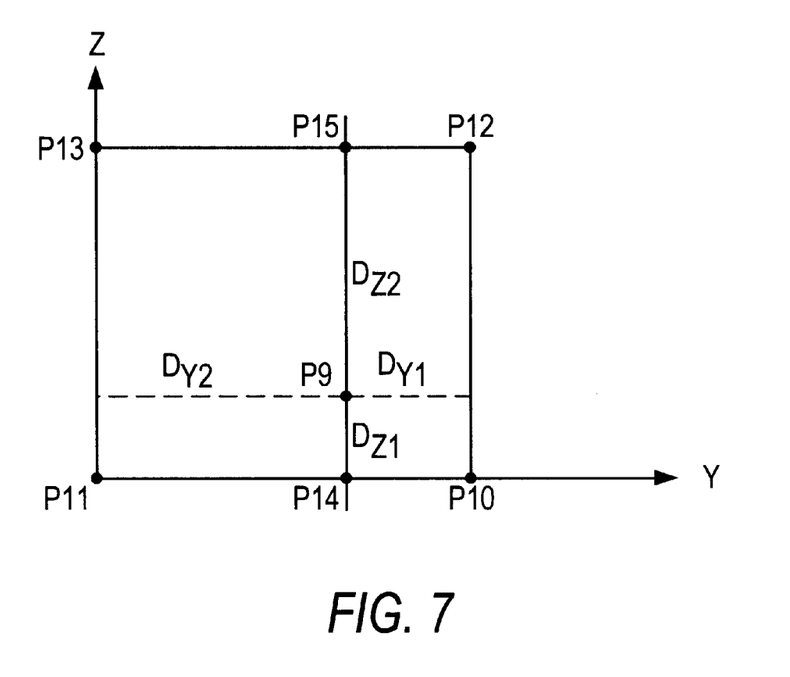
FIG. 7 is a graphical illustration of points and distances used in bilinear interpolation after a first stage of trilinear interpolation.

FIGS. 6 and 7 illustrate the points and distances involved in trilinear interpolation. In particular, eight points and three distance ratios, one in each of the three coordinate directions (e.g., x-axis, y-axis, and z-axis), are used. In many instances, the eight points are neighboring points that form a cube of unit length or any other length. The eight points can alternatively form any box shape (e.g., in the shape of a cube but with rectangular sides). Because the eight points form a box shape, the linear interpolation factors for pairs of points in the same axis direction are the same. For trilinear interpolation, eight points P1–P8 are provided with the following distance ratios:

$$F_X=D_{X2}/(D_{X1}+D_{X2})$$

$$F_Y=D_{Y2}/(D_{Y1}+D_{Y2})$$

$$F_Z=D_{Z2}/(D_{Z3}+D_{Z2}) \qquad (16)$$

Trilinear interpolation involves three stages in which the first stage performs four linear interpolations to produce four interpolated values. The second stage uses the four interpolated values to perform two more linear interpolations that produce two additional interpolated values. The third stage uses the two interpolated values from the second stage to perform a linear interpolation that produces the desired interpolated value. The first stage involves interpolating four pairs of points or values. With the resulting four interpolated values, the last two stages can follow the process of bilinear interpolation as described above with respect to FIGS. 3–5.

There are other ways to implement trilinear interpolation. For example, the first stage can interpolate along the x-axis, the next stage along the y-axis, and the last stage along the z-axis. Alternatively, interpolation can be performed using other axis orders.

Figure 8:
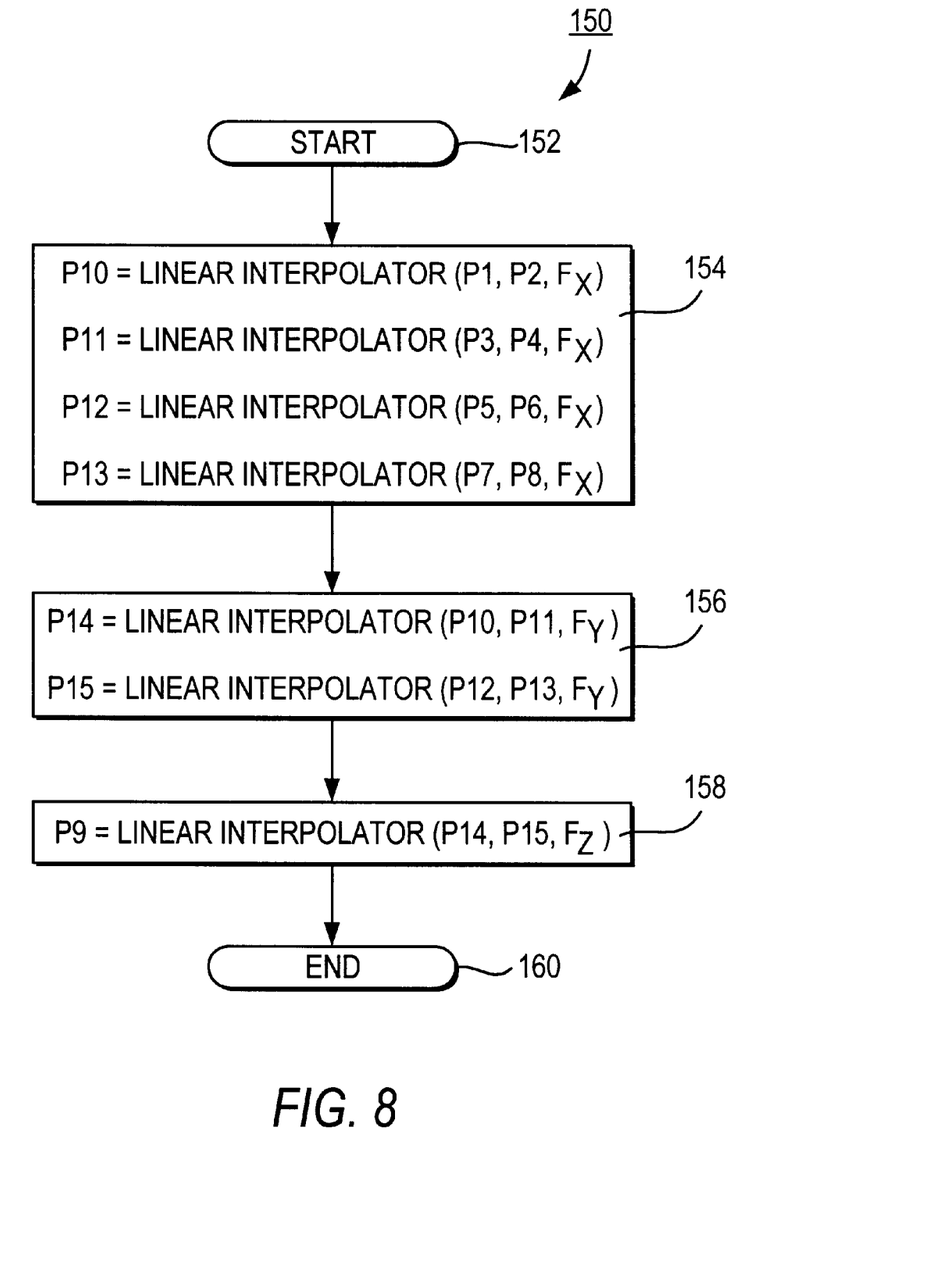
FIG. 8 is a flow chart of an exemplary embodiment of trilinear interpolation according to the present invention.

FIG. 8 is a flow diagram of trilinear interpolation in accordance with the present invention. Process 150 begins at step 152 with eight points P1–P8 and linear interpolation factors $F_X$, $F_Y$, and $F_Z$. First stage 154 linearly interpolates along the x-axis with four pairs of points, P1–P2, P3–P4, P5–P6, and P7–P8, and linear interpolation factor $F_X$ to produce interpolated values P10, P11, P12, and P13, respectively. Second stage 156 linearly interpolates the interpolated pairs of points P10–P11 and P12–P13 along the y-axis with linear interpolation factor $F_Y$. Second stage 156 is similar to step 104 of bilinear interpolation process 100 (FIG. 4). Linearly interpolating P10–P11 and P12–P13 results in interpolated values P14 and P15, respectively. Lastly, third stage 158 linearly interpolates P14 and P15 along the z-axis with linear interpolation factor $F_Z$. Third stage 158 of trilinear interpolation process 150 is similar to step 106 of bilinear interpolation process 100, which is also the linear interpolation process. Process 150 ends at step 160 with the trilinearly interpolated value P9. Assuming that all three linear interpolation factors are strictly less than one, the trilinear interpolation of the present invention can be calculated as follows:

Stage 1:

$$P10=F_X*P1+\sim F_X*P2+P2$$

$$P11=F_X*P3+\sim F_X*P4+P4$$

$$P12=F_X*P5+\sim F_X*P6+P6$$

$$P13=F_X*P7+\sim F_X*P8+P8 \qquad (17)$$

Stage 2:

$$P14=F_Y*P10+\sim F_Y*P11+P11$$

$$P15=F_Y*P12+\sim F_Y*P13+P13 \qquad (18)$$

Stage 3:

$$P9=F_Z*P14+F_Z*P15+P15 \qquad (19)$$

Similar to performing bilinear interpolation and linear interpolation, trilinear interpolation can be implemented using the multi-bit value approach shown in equation (4), which uses adders instead of multipliers.

Although trilinear interpolation is computationally complex, the present invention greatly increases the efficiency and speed of such calculations while also reducing the required circuit area of the interpolator. Moreover, because of the many computations, implementing the trilinear interpolator in hardware rather than in software may be more advantageous.

Trilinear interpolation can be implemented in hardware in a number of ways. Trilinear interpolation can be implemented using cascaded adder trees or any combination of adder trees similarly shown for linear and bilinear interpolation. To reduce the number of adder trees, interpolation results can be stored in registers and then fed into one of the same adder trees to perform additional calculations. Although using a full set of adder trees at each stage increases performance speed because of parallel processing, the cost of such an implementation also increases.

Thus it is seen that the present invention provides linear interpolators that are accurate and cost effective. One skilled in the art will appreciate that the present invention can be practiced by other than the described embodiments, which are presented for purposes of illustration and not of limitation, and the present invention is limited only by the claims which follow.

I claim:

1. Apparatus for linearly interpolating between first and second values given a distance ratio, said ratio being a difference between said second value and an intermediate value divided by a difference between said second value and said first value, said ratio represented by logical bits, said apparatus comprising:
   a multiplexer comprising:
      a first input coupled to receive said first value,
      a second input coupled to receive said second value,
      a select input coupled to receive one said bit of said distance ratio, and
      an output;
   a first adder comprising:
      a first input coupled to receive a rounding term,
      a second input coupled to receive said second value, and
      an output;
   a second adder comprising:
      a first input coupled to said output of said first adder,
      a second input coupled to said output of said multiplexer, and
      an output; and
   a logical shifter comprising:
      an input coupled to said output of said second adder, and
      an output providing a linearly interpolated value.

2. The apparatus of claim 1 wherein said distance ratio comprises a value greater than or equal to about zero and less than about one.

3. The apparatus of claim 1 wherein said rounding term comprises a value of about 0.5.

4. The apparatus of claim 1 wherein said rounding term comprises a value of zero.

5. The apparatus of claim 1 further comprising N multiplexers, where N represents a number of said bits in said distance ratio.

6. The apparatus of claim 5 wherein
   said select input of each said multiplexer is coupled to a respective one of said bits of said distance ratio;
   said output outputs said first value if said select input is logical one; and
   said output outputs said second value if said select input is logical zero.

7. The apparatus of claim 1 further comprising (N+1) adders, where N represents a number of said bits in said distance ratio.

8. The apparatus of claim 1 wherein at least one said adder comprises a simple ripple-carry adder.

9. The apparatus of claim 1 wherein at least one said adder comprises a carry-save adder.

10. The apparatus of claim 1 further comprising N logical shifters where N represents a number of said bits in said distance ratio.

11. The apparatus of claim 1 wherein said logical shifter comprises a logical shift right by one bit.

12. Apparatus for linearly interpolating between first and second values given a distance ratio, said ratio being a difference between said second value and an intermediate value divided by a difference between said second value and said first value, said ratio represented by logical bits, said apparatus comprising:
   a first multiplexer comprising:
      a first input coupled to receive said first value,
      a second input coupled to receive said second value,
      a select input coupled to receive one said bit of said distance ratio, and
      an output;
   a first adder comprising:
      a first input coupled to receive a rounding term,
      a second input coupled to receive said second value, and
      an output;
   a second adder comprising:
      a first input coupled to said output of said first adder,
      a second input coupled to said output of said first multiplexer, and
      an output;
   a first logical shifter comprising:
      an input coupled to said output of said second adder, and
      an output;
   a second multiplexer comprising:
      a first input coupled to receive said first value,
      a second input coupled to receive said second value,
      a select input coupled to receive another said bit of said distance ratio, and
      an output;
   a third adder comprising:
      a first input coupled to said output of said first logical shifter,
      a second input coupled to said output of said second multiplexer, and
      an output; and
   a second logical shifter comprising:
      an input coupled to said output of said third adder, and
      an output providing a linearly interpolated value.

13. The apparatus of claim 12 wherein said distance ratio comprises a value greater than or equal to about zero and less than about one.

14. The apparatus of claim 12 wherein said rounding term comprises a value of about 0.5.

15. The apparatus of claim 12 wherein at least one said adder comprises a simple ripple-carry adder.

16. The apparatus of claim 12 wherein said logical shifter comprises a logical shift right by one bit.

17. A method of linearly interpolating between first and second values given a distance ratio that includes a distance from one said value to an intermediate value, said ratio represented by logical bits, said method comprising:

selecting one of said first and second values based on a value of one said bit of said distance ratio;

adding said second value to a rounding term to produce a first sum;

adding said first sum to said selected one to produce a second sum; and shifting said second sum right by one bit to produce a linearly interpolated value.

18. The method of claim 17 further comprising calculating said distance ratio as a difference of said second value and said intermediate value divided by a difference of said second value and said first value.

19. The method of claim 17 wherein said distance ratio comprises a value greater than or equal to about zero and less than about one.

20. The method of claim 17 wherein said rounding term comprises a value of about 0.5.

21. The method of claim 17 wherein said rounding term comprises a value of zero.

22. The method of claim 17 wherein said selecting comprises:

selecting said first value when said value of said bit is a logical one; and selecting said second value when said value of said bit is a logical zero.

23. The method of claim 17 wherein said shifting comprises shifting a logical zero into a most significant bit position.

24. The method of claim 17 wherein said shifting comprises discarding a carry bit.

25. A method of linearly interpolating between first and second values given a distance ratio that includes a distance from one said value to an intermediate value, said ratio represented by logical bits, said method comprising:

selecting a first one of said first and second values based on a value of one said bit of said distance ratio;

adding said second value to a rounding term to produce a first sum;

adding said first sum to said selected first one to produce a second sum;

shifting said second sum right by one bit to produce a shifted sum;

selecting a second one of said first and second values based on a value of a second said bit of said distance ratio;

adding said shifted sum to said selected second one to produce a third sum; and shifting said third sum right by one bit to produce a linearly interpolated result.

26. The method of claim 25 further comprising calculating said distance ratio as a difference of said second value and said intermediate value divided by a difference of said second value and said first value.

27. The method of claim 25 wherein said rounding term comprises a value of about 0.5.

28. The method of claim 25 wherein said shifting said second sum comprises shifting a logical zero into a most significant bit position.

29. The method of claim 25 wherein said shifting said second sum comprises discarding a carry bit.

30. The method of claim 25 wherein said shifting said third sum comprises shifting a logical zero into a most significant bit position.

31. The method of claim 25 wherein said shifting said third sum comprises discarding a carry bit.

32. A method of linearly interpolating between first and second values given an intermediate value, said method comprising:

calculating a distance ratio as a difference of said second value and said intermediate value divided by a difference of said second value and said first value;

selecting one of said first and second values based on a value of one bit of said distance ratio;

adding said second value to a rounding term to produce a first sum;

adding said first sum to said selected one to produce a second sum; and shifting said second sum right by one bit to produce a linearly interpolated value, wherein said shifting comprises shifting a logical zero into a most significant bit position.

33. A method for linearly interpolating between first and second values given a distance ratio, said ratio being a difference between said second value and an intermediate value divided by a difference between said second value and said first value, said ratio represented by logical bits, said method comprising:

providing a number that indicates the number of bits in said distance ratio;

providing said second value; and calculating a linearly interpolated value using the equation:

$$[M_0+(M_1<<1)+(M_2<<2)+ \ldots +(M_{n-1}<<(n-1))+(P2<<n)+P2]>>n$$

wherein:

n is said number of bits in said distance ratio;

P2 represents said second value;

$M_0$ equals said first value if one said bit of said distance ratio is a logical one and equals said second value if said one bit is a logical zero;

$M_1$ equals said first value if a second said bit of said distance ratio is a logical one and equals said second value if said second bit is a logical zero;

$M_{n-1}$ equals said first value if an $n^{th}$ said bit of said distance ratio is a logical one and equals said second value if said $n^{th}$ bit is a logical zero;

operator "<<" is a logical shift left by a number of bits indicated immediately right of said operator "<<"; and operator ">>" is a logical shift right by a number of bits indicated immediately right of said operator ">>".

34. The method of claim 33 wherein said (P2<<n) term is ignored when said distance ratio is less than one.

35. Apparatus for linearly interpolating between first and second values given a distance ratio, said ratio being a difference between said second value and an intermediate value divided by a difference between said second value and said first value, said ratio represented by logical bits, said apparatus comprising:

multiplexer means comprising:
a first input coupled to receive said first value,
a second input coupled to receive said second value,
a select input coupled to receive one said bit of said distance ratio, and
an output;

first adder means comprising:
a first input coupled to receive a rounding term, a second input coupled to receive said second value, and an output;

second adder means comprising:

a first input coupled to said output of said first adder, a second input coupled to said output of said multiplexer, and an output; and logical shifter means comprising:

an input coupled to said output of said second adder, and an output providing a linearly interpolated value.

36. Apparatus for linearly interpolating between first and second values given a distance ratio, said ratio being a difference between said second value and an intermediate value divided by a difference between said second value and said first value, said ratio represented by logical bits, said apparatus comprising:

first multiplexer means comprising:

a first input coupled to receive said first value, a second input coupled to receive said second value, a select input coupled to receive one said bit of said distance ratio, and an output;

first adder means comprising:

a first input coupled to receive a rounding term, a second input coupled to receive said second value, and an output;

second adder means comprising:

a first input coupled to said output of said first adder, a second input coupled to said output of said first multiplexer, and an output;

first logical shifter means comprising:

an input coupled to said output of said second adder, and an output;

second multiplexer means comprising:

a first input coupled to receive said first value, a second input coupled to receive said second value, a select input coupled to receive another said bit of said distance ratio, and an output;

third adder means comprising:

a first input coupled to said output of said first logical shifter, a second input coupled to said output of said second multiplexer, and an output; and second logical shifter means comprising:

an input coupled to said output of said third adder, and an output providing a linearly interpolated value.

37. Apparatus for linearly interpolating between first and second values given a distance ratio that includes a distance from one said value to an intermediate value, said apparatus comprising:

means for selecting one of said first and second values based on a value of one bit of said distance ratio;

means for adding said second value to a rounding term to produce a first sum;

means for adding said first sum to said selected one to produce a second sum; and means for shifting said second sum right by one bit to produce a linearly interpolated value.

38. Apparatus for linearly interpolating between first and second values given a distance ratio that includes a distances from one said value to an intermediate value, said apparatus comprising:

means for selecting a first one of said first and second values based on a value of one bit of said distance ratio;

means for adding said second value to a rounding term to produce a first sum;

means for adding said first sum to said selected first one to produce a second sum;

means for shifting said second sum right by one bit to produce a shifted sum;

means for selecting a second one of said first and second values based on a value of a second bit of said distance ratio;

means for adding said shifted sum to said selected second one to produce a third sum; and means for shifting said third sum right by one bit to produce a linearly interpolated result.

39. Apparatus for linearly interpolating between first and second values given an intermediate value, said apparatus comprising:

means for calculating a distance ratio as a difference of said second value and said intermediate value divided by a difference of said second value and said first value;

means for selecting one of said first and second values based on a value of one bit of said distance ratio;

means for adding said second value to a rounding term to produce a first sum;

means for adding said first sum to said selected one to produce a second sum; and means for shifting said second sum right by one bit to produce a linearly interpolated value, wherein said shifting comprises shifting a logical zero into a most significant bit position.

40. Apparatus for linearly interpolating between first and second values given a distance ratio, said ratio being a difference between said second value and an intermediate value divided by a difference between said second value and said first value, said ratio represented by logical bits, said apparatus comprising means for executing:

$$[M_0+(M_1<<1)+(M_2<<2)+ \ldots +(M_{n-1}<<(n-1))+(P2<<n)+P2] >>n$$

wherein:

n is a number of bits in said distance ratio;

P2 represents said second value;

$M_0$ equals said first value if one said bit of said distance ratio is a logical one and equals said second value if said one bit is a logical zero;

$M_1$ equals said first value if a second said bit of said distance ratio is a logical one and equals said second value if said second bit is a logical zero;

$M_{n-1}$ equals said first value if an $n^{th}$ said bit of said distance ratio is a logical one and equals said second value if said $n^{th}$ bit is a logical zero;

operator "<<" is a logical shift left by a number of bits indicated immediately right of said operator "<<"; and operator ">>" is a logical shift right by a number of bits indicated immediately right of said operator ">>".

41. The apparatus of claim 40 wherein said (P2<<n) term is ignored when said distance ratio is less than one.

* * * * *

UNITED STATES PATENT AND TRADEMARK OFFICE
CERTIFICATE OF CORRECTION

PATENT NO. : 6,742,008 B2  
DATED : May 25, 2004  
INVENTOR(S) : Bentz

Page 1 of 1

It is certified that error appears in the above-identified patent and that said Letters Patent is hereby corrected as shown below:

Column 1,  
Line 30, "$I_{v2}$" should be -- $I_{v1}$ --.  
Line 37, "(AISC)" should be -- (ASIC) --.

Column 2,  
Line 12, ""1"" should be -- "1," --.

Column 4,  
Line 4, "0<F<1" should be -- $0 \leq F \leq 1$ --.  
Line 42, "0<F<1" should be -- $0 \leq F < 1$ --.

Column 6,  
Line 38, "$F_X = D_{X2} (D_{X1}+D_{X2})$" should be -- $F_X = D_{X2}/(D_{X1}+D_{X2})$ --.  
Line 40, "$F_Y = D_{Y2} (D_{Y1}+D_{Y2})$" should be -- $F_Y = D_{Y2}/(D_{Y1}+D_{Y2})$ --.

Column 8,  
Line 8, "$F_Z = D_{Z2}/(D_{Z3}+D_{Z2})$" should be -- $F_Z = D_{Z2}/(D_{Z1}+D_{Z2})$ --.  
Line 64, "P9=$F_Z$*P14+$F_Z$*P15+P15" should be -- P9=$F_Z$*P14+~$F_Z$*P15+P15 --.

Column 14,  
Line 2, "distances" should be -- distance --.

Signed and Sealed this

Twenty-fifth Day of January, 2005

JON W. DUDAS  
*Director of the United States Patent and Trademark Office*